(No Model.)
M. E. MINOR.
DUST PAN.
No. 492,373. Patented Feb. 21, 1893.
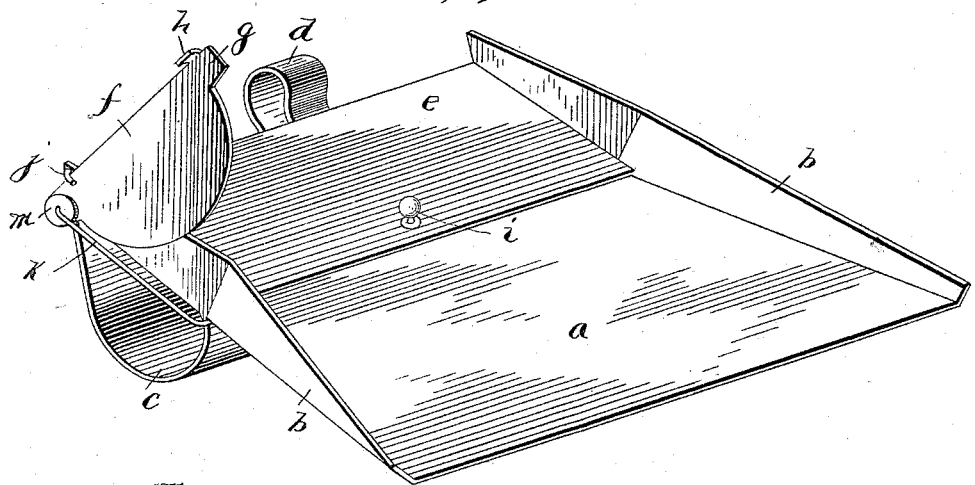
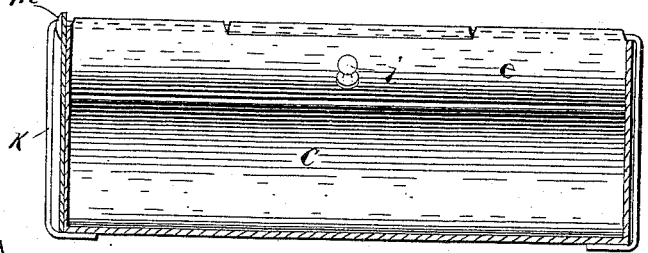
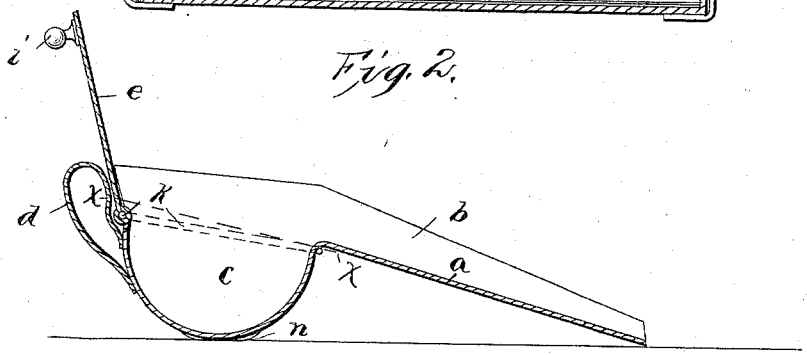
WITNESSES:
INVENTOR
Mary E. Minor
BY
ATTORNEY

UNITED STATES PATENT OFFICE.

MARY E. MINOR, OF COLFAX, INDIANA.

DUST-PAN.

SPECIFICATION forming part of Letters Patent No. 492,373, dated February 21, 1893.

Application filed April 20, 1892. Serial No. 429,899. (No model.)

*To all whom it may concern:*

Be it known that I, MARY E. MINOR, of Colfax, in the county of Clinton and State of Indiana, have invented certain new and useful Improvements in Dust-Pans; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in dust pans.

The object of the invention is to provide an improved dust pan exceedingly cheap, simple, and durable in construction and strongly constructed of a minimum number of parts.

A further object of the invention is to provide an improved dust pan so constructed that the dust can be swept into the pan without stooping to manipulate the pan and so that the dust can be inclosed within the pan and discharged from one end thereof when necessary.

The invention consists in certain novel features of construction and combinations of parts more fully described hereinafter and particularly pointed out in the claims.

Referring to the accompanying drawings:—Figure 1 is a perspective view of the improved dust pan, the side discharge being shown open. Fig. 2 is a vertical section through the pan showing the cover of the dust receiving receptacle open. Fig. 3 is a sectional view taken in plane of line $x$—$x$ Fig. 2 showing the manner of hinging the covers of the dust receptacle and also the means of bracing or strengthening the pan.

In the drawings, $a$ indicates the inclined portion of the dust pan having the side guide flanges $b$ as usual. The front edge of the inclined portion or way is formed to rest snugly on the sheet floor. The rear portion of the sheet of metal forming this inclined way is bent downwardly to form the preferably semi-cylindrical dust receptacle $c$, into which the dust way formed by the face $a$, and guides $b\ b$, discharges, the guides $b\ b$, preferably extending across the ends of the dust receptacle.

$d$, indicates an upwardly extending handle of any suitable and desirable construction attached to the rear portion of the dust receptacle.

$e$, indicates a flat cover for the dust receptacle at its rear edge hinged to the upper rear edge of the dust receptacle to close the receptacle as shown in Fig. 1 or to swing open as shown in Fig. 2 and rest against the handle $d$, which holds it in an upright position forming a back stop for the dust when swept up the inclined portion of the dust pan, thereby preventing the dust flying over the pan and forcing the same to drop down into the dust receptacle.

One end of the dust receptacle is permanently closed. The other end of the receptacle is closed by a vertically swinging slide or door $f$, at one edge hinged preferably, to the upper rear end of the dust receptacle so that said door can swing up and open the end of the dust receptacle and permit the contents thereof being discharged or can swing down and close said open end. The downward movement of said door $f$, being limited by the projection $g$, from the door engaging a stop. Said projection $g$, is also provided with a handle $h$, and the cover $e$, is also provided with a knob or handle $i$ for raising.

$j$, indicates a stop rigid with the guide $g$ for limiting the upward swing of the door $f$.

$k$, indicates a stiff wire extending along the upper rear edge of the dust receptacle and secured thereto and forming the hinge on which the cover $e$, swings. The ends of this wire extend forwardly and transversely across the ends of the dust receptacle and at their front ends are bent in and secured to the front side of the dust receptacle beneath the incline $a$. This wire braces and strengthens the dust receptacle and entire dust pan. It forms the hinge or pivot for the cover $e$ and it also forms the pivot or hinge on which the door $f$ swings, and also the stop engaged by the lug or projection $g$, of said door. The door $f$, moves vertically between the wire $k$, and end of the dust receptacle and is thereby always guided and held in position. There is preferably a washer $m$, secured on the wire $k$, between which and the end of the dust receptacle the door $f$ swings. $n$, indicates lugs or feet on the front portion of the underside of the dust receptacle which hold the bottom of the receptacle from the floor thereby preventing wear and also hold the front edge of the pan firmly to the floor so that all dust and dirt will be taken up easily without necessitating several sweepings. It should be observed that the front edge of the pan and the rests $n$, are the only points on which the pan rests hence as the rear portion is higher than the front portion the edge is forced to the floor and maintained in this position, thus this pan will operate efficiently on uneven floors and surfaces where a flat pan or one having an extended bottom bearing surface would not be operative for taking up the dirt. The front edge of the pan is preferably slightly cupped down. The dust receptacle can be of any desired shape in cross section.

It is evident that various slight changes might be made in the form construction and arrangement of the parts described without departing from the spirit and scope of my invention, hence I do not limit myself to the precise construction herein disclosed.

Having thus fully described my invention, what I claim as new, and desire to secure by Letters Patent of the United States, is—

1. The dust pan having the incline terminating in a dust receptacle provided with an open end, the vertically swinging door to close said end, a stop to limit the upward swing of said door, a guide for the door and a projection to limit the downward movement of the door.

2. The dust pan having the front incline, the rear dust receptacle, having the lid and an open discharge end, the stiffening wire forming the hinge for said lid and passing across the ends of the receptacle and rigidly secured at its ends, the door pivoted on said wire and guided by the same to close the open end of the receptacle.

3. The herein described dust pan having the front incline, the transverse rear semi-cylindrical trough having one end closed permanently, the handle extending up from the rear edge of said trough, the trough cover hinged at its rear edge to the rear edge of the cover so that it can swing back against said handle and prevent dust flying over the pan when in use, and the vertically swinging pivoted slide closing said open end of the trough, substantially as described.

4. The dust pan consisting of the incline, the trough at the upper end thereof having an open end, the vertically swinging slide at one end pivoted to the rear edge of said trough to close or open said end, a guide for said slide between which and the end of the trough the slide moves, substantially as described.

In testimony that I claim the foregoing as my own I affix my signature in presence of two witnesses.

MARY E. MINOR.

Witnesses:
JOHN D. BLACKER,
W. T. DUNBAR.